INVENTOR.
George B. Richards

Jan. 25, 1966     G. B. RICHARDS     3,230,966
FLUID SEPARATOR

Filed May 22, 1963     6 Sheets-Sheet 5

INVENTOR.
George B. Richards
BY
Fiedler, Beardsley, Bradley,
Polnaude & Petherbridge Att'ys.

Jan. 25, 1966  G. B. RICHARDS  3,230,966
FLUID SEPARATOR
Filed May 22, 1963  6 Sheets-Sheet 6

INVENTOR.
George B. Richards
BY
Fidler, Boardsley, Bradley
Patnaude & Petherbridge Att'ys.

United States Patent Office 3,230,966
Patented Jan. 25, 1966

3,230,966
FLUID SEPARATOR
George B. Richards, Lake Forest, Ill., assignor to Liquid Controls Corporation, North Chicago, Ill., a corporation of Illinois
Filed May 22, 1963, Ser. No. 282,358
8 Claims. (Cl. 137—202)

This invention relates to fluid separators and has to do more particularly with a fluid separator of the character wherein an actuator is connected to resilient bowed pressure elements which position the actuator for movement in either of two directions along a predetermined path.

One example of a fluid separator of the general character to which the present invention relates is shown, described and claimed in United States Patent No. 3,021,861, granted February 20, 1962, to Henry Robert Billeter and George B. Richards. The said Billeter and Richards patent in the illustrative embodiment discloses the actuator mechanism as employed in a liquid level controlled device such as an air eliminator or liquid segregator or others wherein is provided a casing defining a chamber having an opening thereinto, a plurality of internal face portions disposed symmetrically about an axis, an actuator movable in the chamber along the axis, and a plurality of normally flat resilient strip members or pressure elements having first portions secured to said casing adjacent the face portions, second portions secured to the actuator, and intermediate portions which are free and maintained in bowed shape, the strip members being bent back upon themselves and of sufficient length to form two substantially parallel portions.

Devices having a valve or valve controlled by the level of a liquid in a container are in wide use. Among such devices are air eliminators for removing or other gases from liquid lines. Air eliminators are employed usually in separating two immiscible fluids of different specific gravities, at least one of which is a liquid. The lighter fluid is usually a gaseous material such as air. In air eliminators of conventional construction, a chamber having a valve-controlled outlet is connected to a liquid line and a float is disposed in the chamber and is connected to the valve for opening or closing the valve in accordance with the liquid level in the chamber. Thus, so long as air continues to enter the chamber from the liquid line, the liquid level does not rise and the float remains at a low level so that the valve remains open. However, when the air no longer enters the chamber, the liquid level rises and lifts the float to close the valve and thus prevent further discharge of air and any discharge of the liquid. Devices embodying float actuated valves also are used for such varied purposes as segregating two immiscible liquids such as petroleum products and water, controlling fluid actuated devices, priming centrifugal pumps and other uses. The present invention is especially suitable for use in many such devices.

It will be understood that while in the present application the pressure elements or at least one of them is disclosed as serving as a valve member to close an orifice, the pressure elements may serve merely as guiding or positioning elements and having no valving function.

It will be further understood while the actuator is disclosed as taking the form of a float which is supported by a liquid and rises and falls with the rise and fall of the level of the liquid, the actuator may be adapted to be moved in either direction by forces generated by other means than the level of a liquid. Thus the actuator may include means other than a liquid supported float for moving the stop along the axis of movement with the strips serving to position the actuator for movement along such axis. In such case, the actuator is supported and actuated by other means (not shown) and the strips serve to position the actuator and to apply an axial force on the actuator which resists or aids the major force on the actuator which tends to move it along the axis. Where the actuator is thus formed, it may be positioned for movement along an axis other than a vertical axis. Thus while the present invention finds wide application in connection with float actuators and is disclosed in connection therewith, it is not limited to such applications.

In the mechanism of the aforesaid Billeter and Richards patent, all of the strip members are similar and they are all arranged symmetrically with respect to the axis of movements of the actuator. In accordance with the invention the strip members are dissimilar and in some cases arranged symmetrically about the axis and in other cases arranged asymmetrically. In one application of the device, a relatively wide orifice is provided in one face and a relatively wide strip member to control such orifice. However, it is not necessary that the second orifice and cooperating strip member be so wide, in fact, in some instances, the second orifice is not necessary and it is only necessary to provide a balancing strip member. In another application, one strip member is relatively thick and heavy in order that it may be capable of withstanding relatively high differential pressure over the orifice, but without proportionately increasing the overall width of the actuator mechanism. In a further application, three or more orifices are provided and controlled by strip members which are not all similar and which are disposed in balanced arrangement so that the actuator is positioned to move along an axis inwardly of the opposed walls.

There are certain instances where it is desirable to provide an arrangement wherein all the strip members are not similar and are not symmetrically disposed about the axis of movement of the actuator. One such example is where it is desired to use a relatively strong strip member cooperating with one face of the housing for withstanding a relatively high differential pressure over the orifice, but it is not necessary that the other strip members be so strong. Another example is where it is desired to use the device as a multiple servo-mechanism wherein the liquid volume requirement at an outlet is less than at a second outlet and it is not necessary that the strip controlling the first outlet be so wide as the strip controlling the second outlet.

In accordance with the present invention, the strip members are not all the same and are arranged symmetrically with respect to the axis of movement of the actuator. In one form, two strip members of different widths are employed. In another form, two strip members of different thickness are provided. In still another form, two strip members of different materials having specific resistance to bending stress are provided. In yet another form, more than two strip members are used, at least one of which has a different resistance to bending with the strip members being arranged relatively to the axis of movement of the actuator in such manner that the vector sum of the forces exerted by the strip members on the actuator is zero in all positions of its movement and the actuator is thus maintained in position for movement along the axis.

An object of the invention is to provide a fluid separator of the type embodying bowed pressure elements and wherein said pressure elements are dissimilar but are arranged to position an actuator for movement in two directions along a predetermined path.

Another object is to provide a fluid separator of the type embodying bowed pressure elements and wherein one of the pressure elements is relatively wide and large and the other and opposing pressure element is narrower and smaller.

Another object is to provide a fluid separator of the type embodying bowed pressure elements and wherein one of the pressure elements is relatively thick and large and the other and opposing pressure element is thinner and smaller.

Another object is to provide a fluid separator of the type embodying bowed pressure elements wherein the pressure elements are arranged in symmetrically relation to the axis of movement of an actuator connected to the pressure elements.

Other objects and advantages of the invention will appear from the following description taken in connection with the appended drawings, wherein.

Inasmuch as the invention is especially well adapted for use in air eliminators, it is illustrated in a preferred embodiment in its application to an air eliminator. However, it will be understood as the description proceeds that the invention is equally well adapted to other uses where an actuator and especially a liquid-level controlled actuator is employed, as for example, in a liquid separator or segregator, two forms of which also are disclosed herein.

Figure 1:
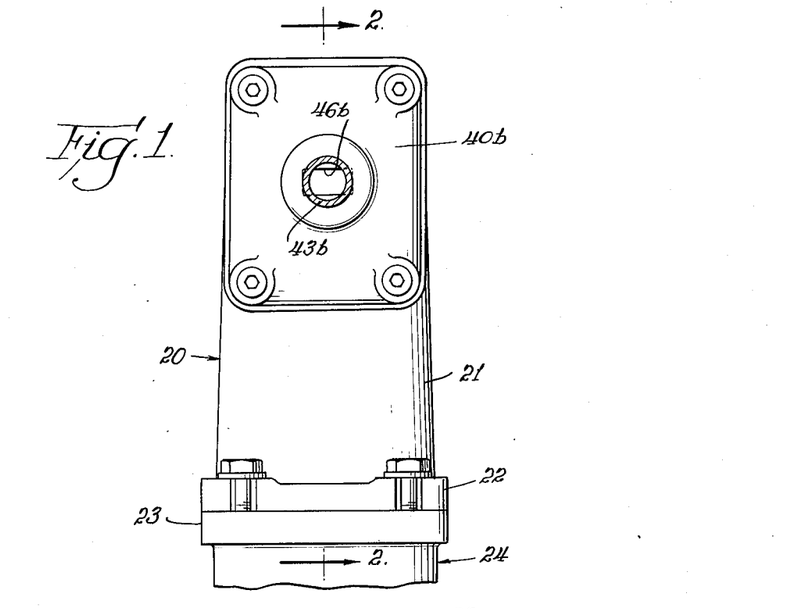
FIGURE 1 is an end elevational view of one form of fluid separator embodying the invention.
Figure 2:
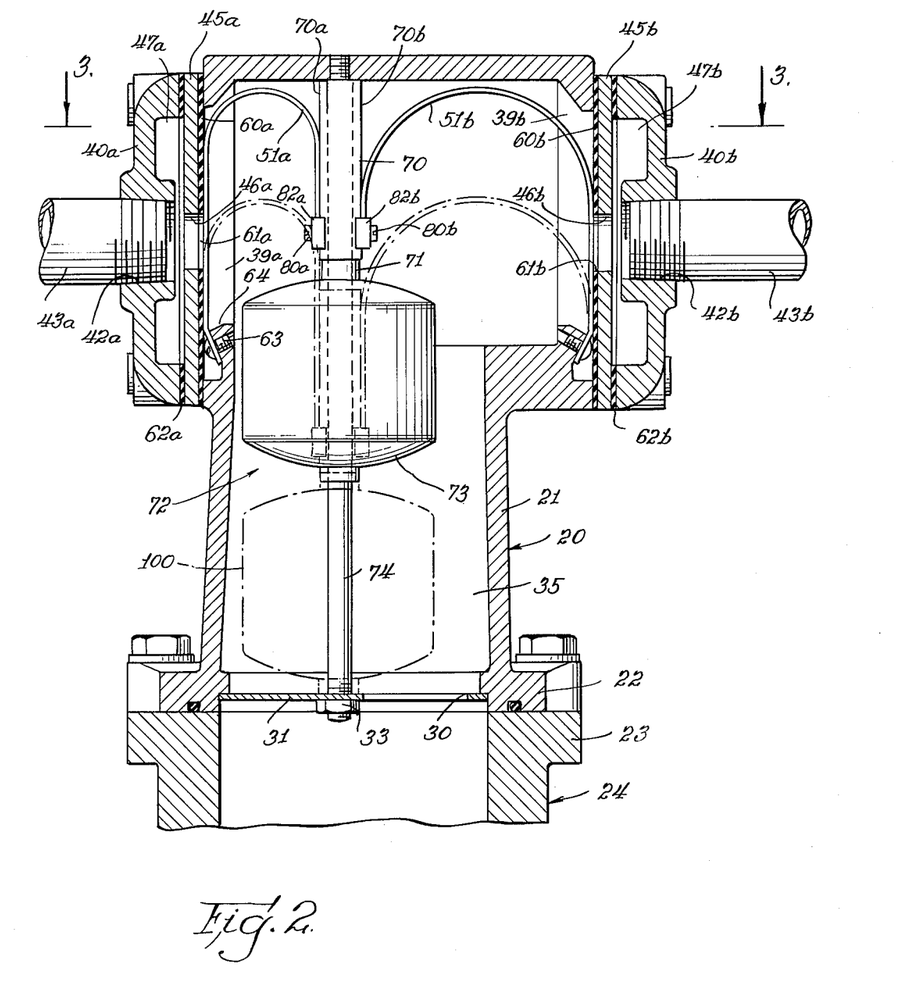
FIG. 2 is an enlarged sectional view taken along line 2—2 of FIG. 1.
Figure 3:
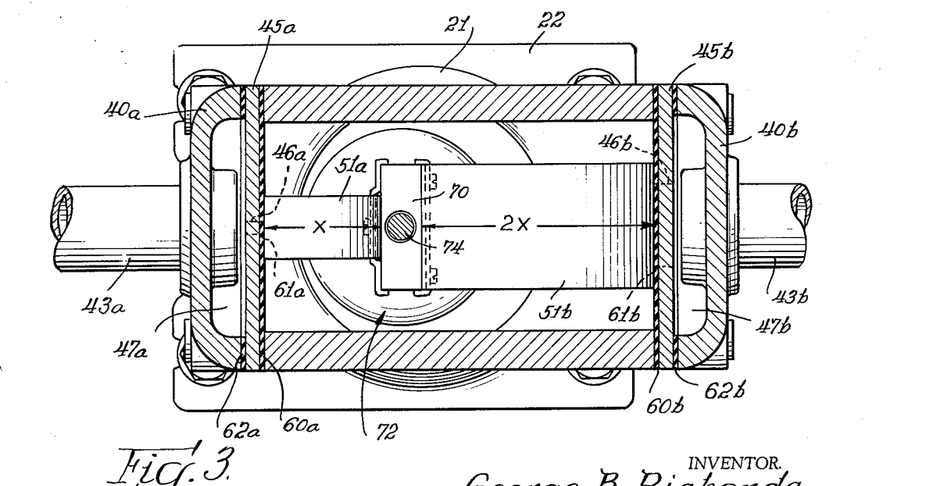
FIG. 3 is a sectional view taken along line 3—3 of FIG. 2.

Referring now particularly to FIGS. 1 to 3 of the drawings, there is shown an air eliminator which includes a head 20 formed by a hollow casing 21, having a bottom flange 22 by which the head is secured to a flange 23 of a tank 24 which may be of any conventional construction.

The interior of the air eliminator tank 24 communicates with the interior of the head 20 through openings 30 (one of which is shown) formed in a plate 31, secured in the casing 21 as by a guide shaft 74 threaded into the top of the casing 21 and a nut 33 threaded on the lower end of the shaft 74.

The casing 21, which at its lower portion is of generally circular cross section and at its upper portion is of generally rectangular cross section, defines a float chamber 35, which communicates relatively freely through the openings 30 with the interior of the tank 24.

The upper portion of the casing 21 is preferably of generally rectangular cross section and defines a valve chamber. Opposite portions of the valve chamber are provided with openings 39a and 39b in its ends which are closed by end plates 40a and 40b respectively, suitably secured to the casing.

The end plates 40a and 40b are both provided with openings 42a and 42b adapted to receive a pipe such as the pipes 43a, and 43b shown threaded into the end plates 40a, 40b in FIG. 2.

Interposed between the casing 21 and each of the end plates respectively are orifice plates 45a and 45b which are suitably secured in place and which are provided with vertically elongate orifices 46a and 46b respectively. The end plates 40a and 40b are recessed and provided with the respective orifice plates 45a and 45b, chambers 47a and 47b which communicate with the float chamber through the orifices 46a and 46b, except when the latter are closed by the valves hereinafter described.

Disposed against the inner face of the orifice plate 45a is a cover gasket 60a, formed with an orifice 61a corresponding in shape to the orifice 46a. A similar gasket 60b is provided for the orifice plate 45b. The gaskets 60a and 60b are clamped between the casing, and the orifice plates respectively, although they alternatively may be adhesively secured to the respective orifice plates in order to insure that they are not displaced and that the orifices in the plates and gaskets remain in alignment. Ring gaskets 62a and 62b are provided between the orifice plates 45a and 45b and the cover plates 40a and 40b respectively. The gaskets are formed from a suitable material which is sufficiently resilient to provide an effective seal between the respective members and which is resistent to the liquid with which the air eliminator is adapted to be used. We have found that a synthetic rubber such as neoprene is excellently adapted for use in forming the gasket although other materials having the desired characteristics may be applied.

The orifices 46a and 46b (as well as the orifices 61a and 61b) are adapted to be closed by valve elements 51a and 51b. Since the valve elements 51a, 51b are generally similar in construction except for width only one of the valve elements and the associated portions of the air eliminator will be described in detail.

The valve element 51a takes the form of an elongated normally flat strip of flexible, resilient material, preferably metal, which is inert to the liquid with which the air eliminator is adapted to be used. While any spring material having suitable flexibility, resiliency and inertness may be used, we have found that a spring steel alloy sold under the name "Elgiloy" provides excellent results.

The valve element 51a is of sufficient width to extend across and completely close the orifice 46a when the valve is in closed position and is of sufficient length to permit it to be mounted and actuated as hereinafter described.

The valve element or strip 51a is rigidly secured to the casing at a point below the orifice 46a and in such position that the adjacent portion of the strip lies against the face of the inside cover gasket 60a, as shown in FIG. 2, at all times. To this end, the lower end of the strip is secured as by a machine screw 63, to a boss 64 projecting from the body in position to suitably support the lower end of the valve element in the desired position.

The boss 64 has an inclined face to which the unbent end of the strip 51a is attached. This insures that the portion of the strip which lies against the gasket 60a is firmly maintained thereagainst.

The other end of the strip 51a is attached to a tubular stop 70 which is formed with a straight, flat face 70a providing a flat surface against which the inner end of the strip is held and against which the adjacent portion of the strip lies to varying degrees as explained hereinafter. The stop 70 is connected to guide stem 71 attached to and forming a portion of a float 72.

From the foregoing it will be seen that the stop 70 serves not only as means for halting the upward movement of the float 72, but it serves also to actuate the strips 51a, 51b by transmitting to the attached ends thereof movement corresponding to the movement of the float 72. Also the stop 70 provides reaction surfaces 70a and 70b in opposing relation to the surfaces of the gaskets 60a and 60b and against which the inner portions of the strips bear. Thus the stop may also be termed an abutment member. The stop 70 in the embodiment shown is secured to and movable with the float ball and may be considered to be part of the float. Since the assembly 100 of the float ball, guide stem and stop serves to actuate the strips, it may be termed an "actuator."

The stem 71 extends through and is sealingly secured in the "ball" portion 73 of the float and projects therefrom at each end. At its upper end the stem 71 is inserted into the stop 70 and is connected thereto by a machine screw 80a etxending through these members. The screw 80a also serves to connect the ends of the valve elements 51a to the stop 70 as shown particularly in FIG. 2 of the drawings. A double channel-shaped clip 82a is provided at the side of the stop 70 and is secured by the screw 80a for the purpose of retaining the ends of the valve element 51a against twisting out of position relatively to the stop 70. The stem 71 is hollow and receives the upstanding guide shaft 74 which is rigidly secured in and upstands from the plate 31. The stem 71 thus serves to guide the float 72 for movement in a vertical direction within the float chamber 35.

The strip 51a is so secured to and supported by the casing and the float that in all positions thereof throughout its range of movement from its upper, closed position (as shown in full lines in FIG. 2) to its lower, open position (shown in broken lines in FIG. 2), it has a free portion extending between the portion which bears against the face of the gasket 60a and the portion which bears against the opposing face 70a of the stop, which free portion is bent back upon itself and assumes a curved shape. As explained more fully hereinafter, the strip 51a exerts equal and opposed forces on the gasket 60a and the face 70a. As the actuator moves up and down the curvature of the free portion of the strip 51a and the force remains constant. Consequently, the energy stored in the strip remains constant.

The inner walls of the orifice plates 45a and 45b and hence the faces of the gasket 60a and 60b are disposed asymmetrically with respect to the central axis of the casing. The actuator is positioned by the elements 51a and 51b for movement along such axis.

In order to provide for closing the larger orifice 46b, the strip member 51b is made of sufficient width. Since the orifice 46a is considerably narrower, it is not necessary that the strip 51a be as wide as the strip 51b. In fact, in some installations, there may be no orifice at all in the plate 45a consequently the strip 51a need have no particular width, but only sufficient width to provide the necessary strength. It is necessary that the forces exerted on the actuator by the strips 51a and 51b be balanced so that the actuator is positioned by the strips for movement along an axis which passes along the interior of the casing, that is, inwardly of the faces of the orifice plates 45a and 45b (the faces of the sealing gaskets where such are provided). By reason of the fact that the strip 51a in the example shown is only one-half as wide as the strip 51b, it will be bent to one-half the radius of the strip 51b and thus apply an equal force on the actuator.

The two valve elements 51a and 51b are connected to the casing 21 and to the stop 70 at diametrically opposite points whereby the two valves 51a and 51b are disposed in opposition. They exert on the stop 70 and accordingly on the float 72 equal and opposite forces so that the float normally is freely positioned by the strips 51a and 51b in the float chamber and does not bear against the guide shaft 74. The guide shaft 74, however, is provided so as to protect the float and strips from damage due to extraneous forces during movement of the air eliminator, as in shipment. Each of the elements 51a and 51b serves as a pressure element which yieldably resists lateral displacement of the actuator.

The second strip or element 51b is formed and supported in a generally similar manner to the element 51a as above described and cooperates with the inner face of the gasket 60b and the opposing face 70b of the stop 70 in a generally similar manner.

Since the assembly consisting of the strips 51a and 51b, the stop 70, and the float 72 is freely positioned, the forces exerted by the respective strips 51a and 51b against the faces of their respective orifice plates 45a and 45b (that is, against the gaskets 60a and 60b) are equal and the strips therefore are completely balanced against each other.

Moreover, the arrangement is such that each of the strips 51a and 51b is under stress throughout its entire range of movement which stress causes the strip to be urged against its orifice plate, throughout a portion of the strip, during its entire range of movement. As will be seen from the drawings when the float is in its lower position (as shown in broken lines in FIG. 2) the strips 51a and 51b bear against the faces of their respective orifice plates 45a and 45b throughout only the lower portions of the strips and at an area on each of the orifice plates below the orifices 46a and 46b. However, as the float 72 rises to its upper position (as shown in full lines in FIG. 2), as established by the abutment of the stop 70 against the upper wall of the float chamber 35, the strips 51a and 51b bear against greater areas of their respective orifice plates and close the orifices 46a and 46b and bear against the plates at portions above the orifices in order to provide complete closures for the two orifices 46a and 46b. Thus it will be seen that strips 51a and 51b are urged in to their positions closing and sealing the orifices 46a and 46b by the resilience of the strips 51a and 51b themselves.

In the operation of the air eliminator thus far described, the tank 24 is suitably connected to a liquid line (not shown) from which it is desired to remove air. Assuming that the air has been removed and liquid stands in the head 20 at a level sufficient to raise the float to its uppermost position (as illustrated in solid lines in FIG. 2) the strips 51a and 51b are in closed positions. Thus the strips lie against their respective orifice plates 45a and 45b and extend entirely over and sealingly close the respective orifices 46a and 46b so that no liquid can escape from the head.

It will be noted that the strips 51a and 51b lie flat against their respective orifice plates throughout a substantial zone thereof and particularly a zone on both sides of and above and below the orifices 46a and 46b so that the latter are fully closed. As noted above, the spring pressure of the strips 51a and 51b provided by reason of their bowed or arcuate form insures that the closing portions thereof are maintained against their respective orifice plates, regardless of whether or not the air or liquid within the float chamber 35 is under pressure.

When air (or other fluids) enters the float chamber 35 from the liquid line such air displaces the liquid in the float chamber 35 and causes the level to fall. When this occurs the float 72, which is buoyantly supported by the liquid, also falls and carries with it the stop 70 to which the strips 51a and 51b are attached. The downward movement of the stop 70 causes the ends of the strips 51a and 51b attached thereto to move downwardly in a direction parallel to the faces of the orifice plates with the result that the portions of the strips 51a and 51b which previously lay against the orifice plates are stripped or "peeled" away from the orifice plates 45a and 45b progressively downwardly and as the downward movement of the float continues the orifices 46a and 46b progressively uncovered in a direction from the upper portions thereof toward the lower portions.

There is a small force resulting from the pressure differential on the two sides of each strip which is applied over that portion of the face of each of the strips which overlies the corresponding orifice and which force tends to maintain each strip against its orifice plate to close the orifice. This force, however, is very small and is relatively ineffective in opposing the opening of the strip. It will be seen that each of the strips is progressively pulled away from its orifice plate and, owing to the resilience of the strip and the arcuate shape into which it is forced by the manner in which it is attached to the casing and to the stop, the strip is moved away from the orifice plate in progressively small increments so that only a small portion of the area of the strip which overlies the orifice plate is moved away from the plate at any instant. Thus, the orifice is progressively uncovered in small increments and any fluid pressure-generated force opposing the movement of such small increments of the strip away from the orifice plate is extremely small.

As stated above, each strip is so supported and the arrangement of the associated elements is such that the free portion of the strip retains a curved shape in all positions of the float. Thus it will be seen that as the float moves downwardly and carries with it the corresponding end of the strip which is secured to the stop 70, the adjacent portion of the strip is progressively flattened and the portion of the strip adjacent the end which is attached to the casing is progressively curved. In other words, the arc or bend in the strip is transferred from a portion nearer to the inner anchored end which is attached to the stop to a portion nearer to the outer anchored end which is attached to the casing.

As soon as the orifices 46a and 46b have been uncovered by the above-described opening movement of the strips 51a and 51b the air or other fluid trapped in the float chamber 35 above the level of the liquid in the system and which normally is under some pressure is caused to flow out of the float chamber through the orifices 46a and 46b and the vent pipe 43a by which it is conducted to a point of disposal.

Should the liquid level in the float chamber fall sufficiently, the downward movement of the actuator will be halted by it bottoming against the plate 31.

The above-described embodiment of applicant's invention is of particular utility where it is desired to provide for the flow of a large volume of fluid through the separator within a minimum size casing.

Where the device is to be used with fluid under relatively high pressure and a wide outlet orifice is to be provided for discharging a large volume of fluid from the interior of the casing or float chamber, a relatively thick and heavy strip is used. This is to prevent distortion of the strip due to pressure applied thereto by the fluid. On the other hand, where it is to be connected to a servo-mechanism (not shown), the opposing orifice is narrower and does not require so thick a strip to resist the pressure differential on the strip. A separator capable of operating under such conditions is shown diagrammatically in FIGS. 4 and 5, to which reference now is made.

Figures 4, 5:
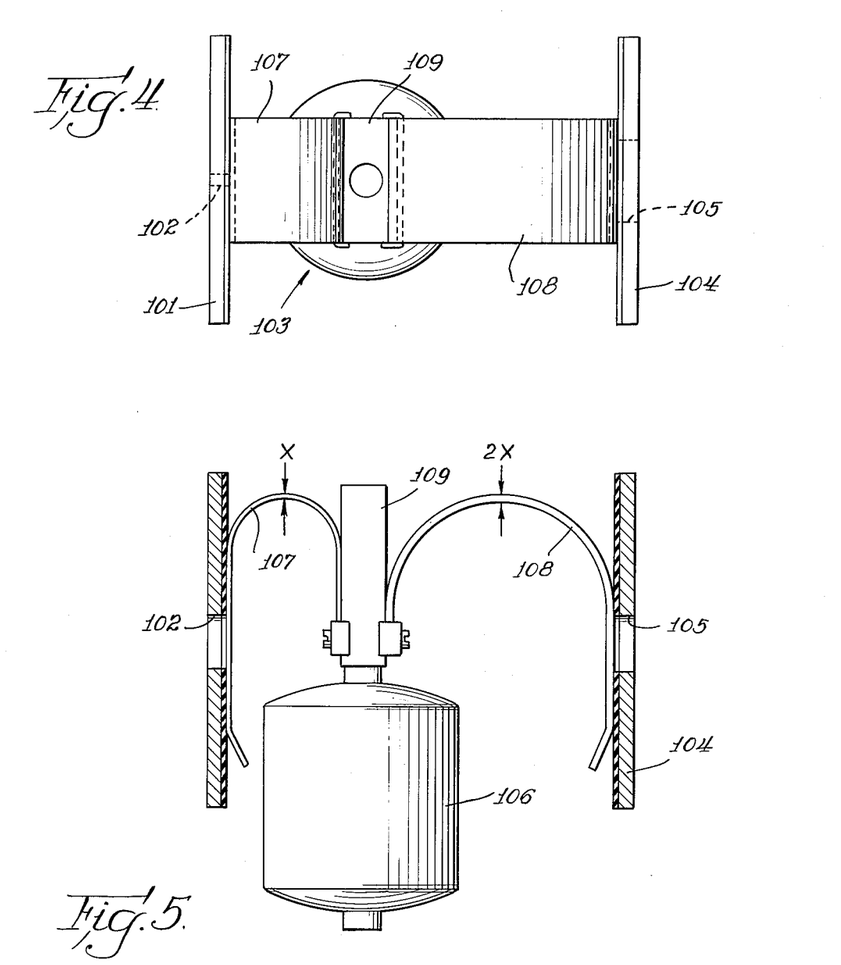
FIG. 4 is a fragmentary top plan view of a portion of a second form of separator.
FIG. 5 is a side elevational view of the structure of FIG. 4.

The separator includes a casing (not shown) having a first wall 101 provided with a narrow orifice 102 leading into the float chamber 103. The separator is also provided with a wall 104, in opposed relation to the first wall 101 and having an orifice 105 of substantial width. An actuator is provided which includes a float 106 having connected thereto strips 107 and 108 in a manner generally similar to that described in connection with the device of FIG. 2. The strips 107 and 108 are suitably secured at one end to the wall members 101 and 104 respectively, and at the other end to a stop 109 connected to the float. The strips are so secured to the stop that they lie against, the opposing flat wall faces to a greater or lesser extent depending upon the position of the actuator.

The strip 108 is of greater thickness than the strip 107 and consequently presents a greater resistance to bending than the strip 107. Thus, when the device is assembled the forces on the float and actuator act to move the float toward the wall 101. The center guide, when used, is suitably located.

Figure 6:
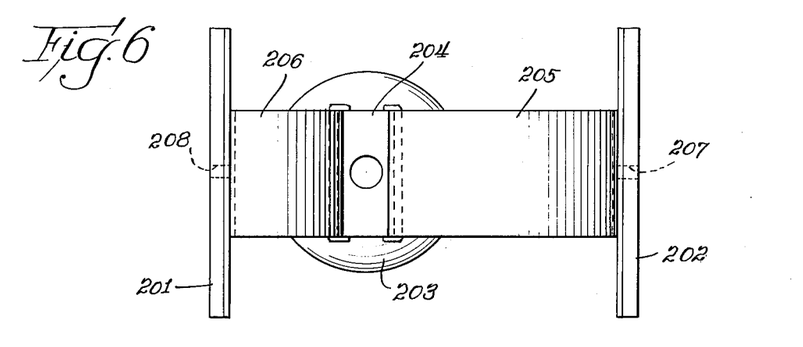
FIG. 6 is a fragmentary top plan view of a portion of a third form of separator.
Figure 7:
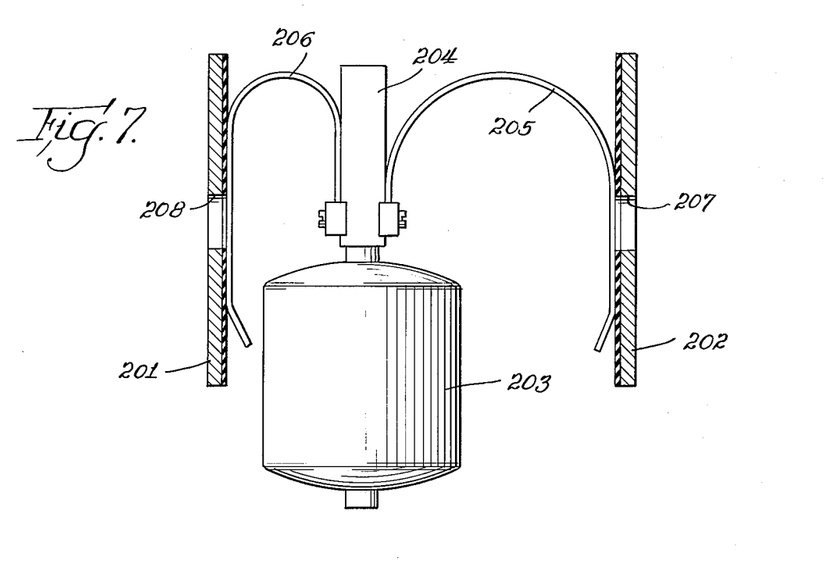
FIG. 7 is a side elevational view of the structure of FIG. 6.

In lieu of making one of the strips thicker than the other as shown in FIGS. 4 and 5, the strips may be of the same dimensions and one strip may be formed of different material than the other, such material having a greater resistance to bending stress than that of the other strip. This form of the invention is shown somewhat diagrammatically in FIGS. 6 and 7. The device has a casing (not shown) having therein side walls 201–202 which with the other walls (not shown) define a float chamber. The device also has, an actuator including a float 203 to which is attached a stop 204. Two strips 205 and 206 of the same width and thickness are provided. The strip 205 is secured at one end to a strip 204 and positioned to lie against the corresponding face of the stop. At the other end, the strip 205 is attached to the wall portion 202 in position to lie against the face of the wall portion 202 and in one position to close an orifice 207, in the wall 202. The other strip 206 is similarly attached to the stop and the other wall 201 in position to overlie a portion of the inner face of the wall and in one position to overlie an orifice 208 formed in the wall 201. This separator operates in the same manner as the separator shown in FIGS. 4 and 5 and described hereinabove.

It is sometimes desirable to provide a separator of such construction that the fluid can be discharged through more than two outlets. It is also sometimes desirable that the discharge start at different times.

Figure 8:
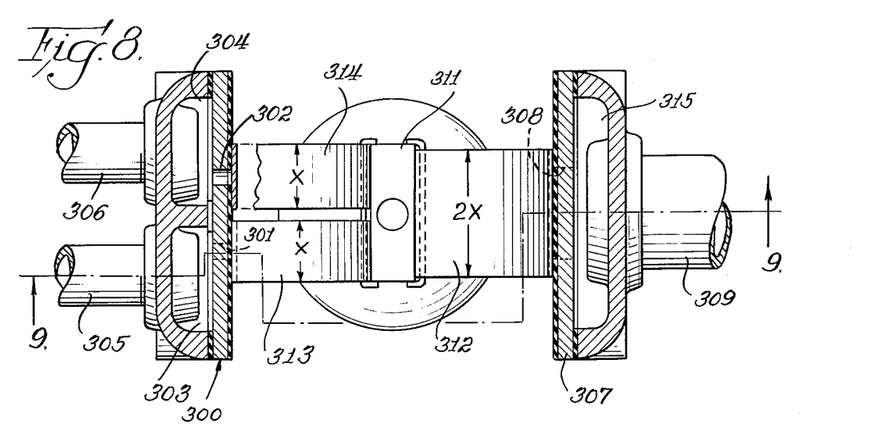
FIG. 8 is a horizontal sectional view through a portion of a fourth form of separator.
Figure 9:
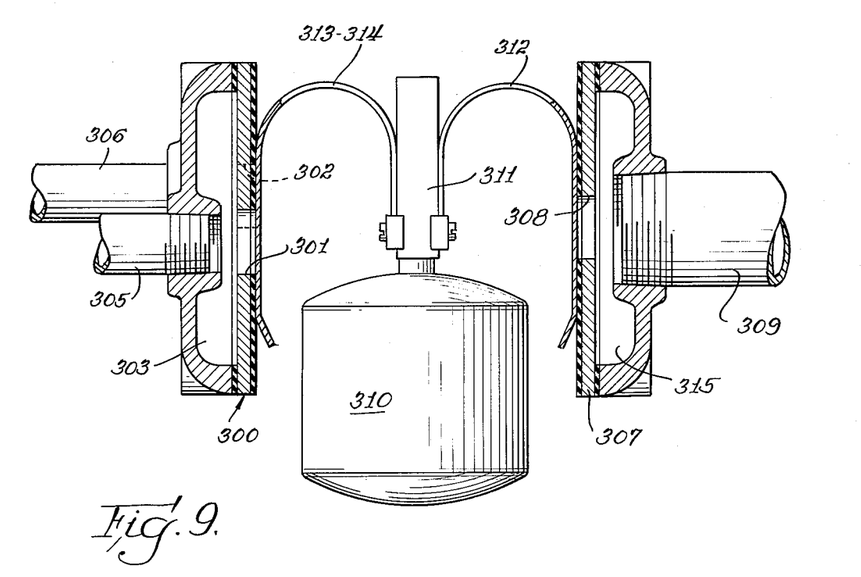
FIG. 9 is a side elevational view of the structure of FIG. 8.

Referring now to FIGS. 8 and 9, there is shown a separator which is generally similar to the separator of FIG. 1, but has a different arrangement of strips and has two orifices in one wall. The device shown in FIGS. 8 and 9 includes a first side wall 300 having orifices 301 and 302 therein which are located at different levels. The casing is provided with two chambers 303 and 304 into which the orifices 301 and 302 open. Pipes 305 and 306 are provided for discharging the fluid to a point of use. Disposed opposite the wall 300 and parallel thereto is a wall 307 having a single, large orifice 308 to which is connected a discharge pipe 309.

Located in the float chamber is an actuator including a float 310 and a stop 311, carried thereby. Three resilient strip members 312, 313, and 314 are provided. The strip member 312 is attached at one end to the stop 311 and at the other end to the wall 307. The strip is arranged so that portions overlie the faces of the wall 307 and of the stop 311. The end wall is formed to provide a chamber 313 in which the orifice 308 opens and which chamber is connected to a discharge pipe 315.

The two strips 313 and 314 are each attached at one end to the stop and at the other end to the wall 300 in such manner that they lie against the respective faces to a greater or lesser extent depending upon the height of the float 310.

Preferably, the single strip 312 is twice the width of the individual strips 313 and 314 and thus equal and opposite forces are applied to the stop 311, that is, on the one side by the strip 312 and by the other strips 313 and 314.

This form of separator operates in a manner generally similar to that described in connection with the actuator of FIG. 1 except that two orifices 301 and 302 and two strips, are provided at one side of the casing which orifices open and close at different times owing to the different elevations of the two orifices 301 and 302. Thus, as the float descends from the position in which the strips close orifices 302 to a predetermined location, the orifice 302 is uncovered.

Upon continued downward movement of the float, the second orifice 301 is opened. When the float raises, at a time when both orifices 301 and 302 are open, then the orifice 301 will first be closed and then the orifice 302 closed.

Figure 10:
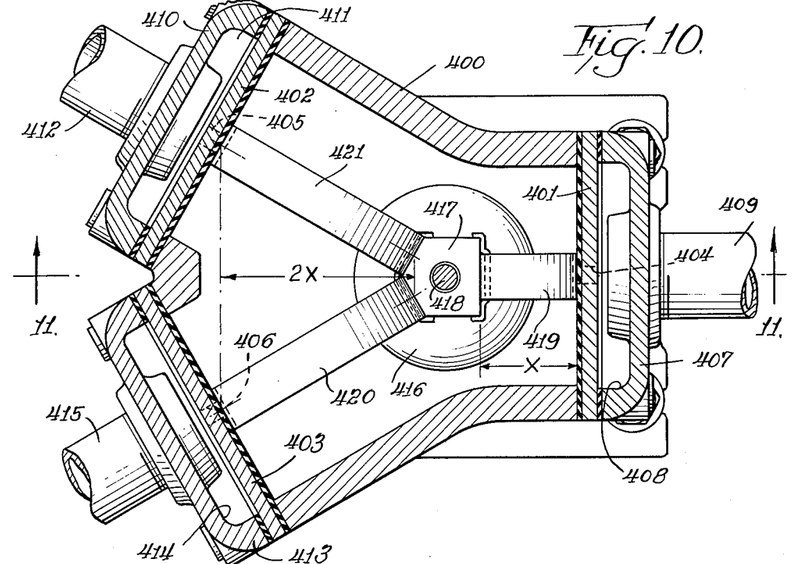
FIG. 10 is a horizontal section through a fifth form of separator.
Figure 11:
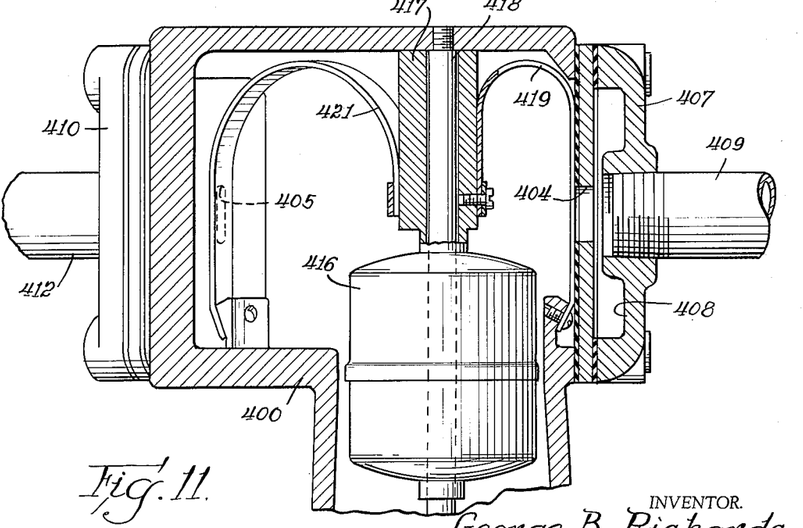
FIG. 11 is a vertical sectional view through the structure of FIG. 9.

It is sometimes desirable, in order to make the device as compact as possible, to arrange the walls in nonsymmetrical arrangement, such as shown in FIGS. 10 and 11 and especially where three or more orifices are desired.

In the device of FIG. 11, a casing 400 is provided with walls 401, 402 and 403 formed respectively with orifices 404, 405 and 406. The end member 407 is provided to define a chamber 408 opening into a discharge pipe 409. An end member 410 defines with the walls 402–404 a chamber 411 from which leads a discharge pipe 412. A further end member 413 is provided which defines with the wall 403 a chamber 414 from which leads a discharge pipe 415.

An actuator is provided which includes a float 416 carrying a stop 417 which moves with the float. A center guide post 418 is provided which is received by the float and the stop. A first strip 419 is provided which is secured at its inner end to the stop 417 and being positioned to lie against a face of the corresponding surface of the stop 417. The other end of the strip 419 is secured to the wall 402 in position to overlie the orifice 404 when the float is in its upper position and to extend away from and not to close the orifice 409 when the float is in its lower position.

Two additional strips 420–421 are provided for closing respectively the orifices 405 to 406. Since these strips are identical in construction, only one will be described in detail. Each strip is secured at its outer end to the corresponding wall in position to overlie the orifice when the float is in its upper position and to be moved away from the wall when the float is in its lower position. On the other hand, the strip is secured to the stop in position to extend along the adjacent face of the stop when the float is in its upper position and to be pealed away from the face when the float is in its lower position.

This construction is utilized where it is desired to have three separator outlets. In the device as illustrated in the drawings, strip 419 is similar in width and thickness to the strips 420 and 421 but is shorter. The arrangement is such that the component of forces exerted by the two strips 420 and 421 on the stop 417 equals the force exerted on the other side of the stop 419 by the single strip 419.

While the two orifices 405 and 406 are shown in the drawings as at the same level, it will be understood that the orifices 405 and 406 may be at different levels and thus closed and opened at a different time.

I claim:

1. A fluid separator comprising casing means defining a chamber and providing a plurality of faces opposed relatively to an axis in said chamber, an actuator movable along said axis and a plurality of resilient strip members, said strip members having first portions secured to said casing means adjacent said faces, respectively, and second portions secured to said actuator, said first and second portions of each strip member being spaced apart by a third and intermediate portion which is free and maintained in bowed shape, each of said strip members being bent back upon itself and being of sufficient length so it forms two generally opposed portions, one lying against the corresponding faces whereby each of the strip members exerts a force on the face with which it cooperates and said strip members position the actuator on the axis for movement therealong between a first position wherein said strip members lie against the corresponding faces to a predetermined extent and a second position wherein said strip members lie against said faces to a lesser extent, at least one of said faces having an orifice opening into said chamber and positioned to be closed by the corresponding strip member when said actuator is in said first position and to be exposed when said actuator is in said second position, said strip members being disposed whereby the planes through their major axes intersect at said axis to which said faces are opposed, at least one of said strip members having a strength resisting bending substantially different from the strength of the other strip members, and said faces and said strip members being oriented relative to one another and to said axis and said faces being spaced from said axis in such manner as to counterbalance the dissimilarities in the strength of said strip members at said axis such that said strip members exert a substantially zero transverse force on said actuator members.

2. A fluid separator as set forth in claim 1 wherein one of said strip members is thicker than another of said strip members.

3. A fluid separator as set forth in claim 1 wherein one of said strip members is wider than another of said strip members.

4. A fluid separator as set forth in claim 1 wherein said faces are disposed asymmetrically relatively to said axis to which said faces are opposed.

5. A fluid separator as set forth in claim 1 wherein said plurality of resilient strip members comprises at least three resilient strip members.

6. A fluid separator comprising casing means defining a chamber and providing two faces opposed relatively to an axis in said chamber, an actuator movable along said axis and two dissimilar, resilient strip members, said strip members having first portions secured to said means adjacent said faces, respectively, and second portions secured to said actuator, said first and second portions of each strip member being spaced apart by a third and intermediate portion which is free and maintained in bowed shape, one of said strip members having a different resistance to bending stress than the other of said strip members, each of said strip members being bent back upon itself and being of sufficient length so it forms two generally opposed portions, one lying against the corresponding face whereby each of the strip members exerts a force on the face with which it cooperates and said strip members position the actuator on the axis for movement therealong between a first position wherein said strip members lie against the corresponding faces to a predetermined extent and a second position wherein said strip members lie against said faces to a lesser extent, said strip members being arranged with their major axes in a single plane extending through said axis, said axis of movement of said actuator being positioned relative to the points of securement of said strip members adjacent said faces such that the forces exerted on said actuator by said strip members are balanced against one another, at least one of said faces having an orifice opening into said chamber and positioned to be closed by the corresponding strip member when said actuator is in said first position and to be exposed when said actuator is in said second position.

7. A fluid separator comprising casing means defining a chamber and providing at least three faces opposed relatively to an axis in said chamber, an actuator movable along said axis and at least three resilient strip members at least one of which is dissimilar in resistance to bending from another, said strip members having first portions secured to said means adjacent said faces, respectively, and second portions secured to said actuator, said first and second portions of each strip member being spaced apart by a third and intermediate portion which is free and maintained in bowed shape, one of said strip members having a different resistance to bending stress than the others of said strip members, each of said strip members being bent back upon itself and being of sufficient length so it forms two generally opposed portions, one lying against the corresponding face whereby each of the strip members exerts a force on the face with which it cooperates and said strip members position the actuator on the axis for movement therealong between a first position wherein said strip members lie against the corresponding faces to a predetermined extent and a second position wherein said strip members lie against said faces to a lesser extent, said strip members being disposed with the planes through their major axes extending parallel to each other and with said one strip member in opposition to said other strip members, said axis of movement of said actuator being positioned relative to the points of securement of said strip members adjacent said faces such that the forces exerted on said actuator by said strip members are balanced against one another, at least one of said faces having an orifice opening into said chamber and positioned to be closed by the corresponding strip member when said actuator is in said first position and to be exposed when said actuator is in said second position.

8. A fluid separator comprising casing means defining a chamber and providing three faces opposed relatively to an axis in said chamber, an actuator movable along said axis and three resilient strip members at least one of which is dissimilar from another, said strip members having first portions secured to said casing means adjacent said faces, respectively, and second portions secured to said actuator, said first and second portions of each strip member being spaced apart by a third and intermediate portion which is free and maintained in bowed shape, each of said strip members being bent back upon itself and being of sufficient length so it forms two generally opposed portions, one lying against the corresponding faces whereby each of the strip members exerts a force on the face with which it cooperates and said strip members position the actuator on the axis for movement theralong between a first position wherein said strip members lie against the corresponding faces to a predetermined extent and a second position wherein said strip members lie against said faces to a lesser extent, said strip members being disposed with the planes through their major axes intersecting at said axis to which said faces are opposed at least one of said faces having an orifice opening into said chamber and positioned to be closed by the corresponding strip member when said actuator is in said first position and to be exposed when said actuator is in said second position, at least one of said strip members having a strength resisting bending substantially different from the strength of the other strip members, and said faces and said strip members being oriented relative to one another and to said axis and said faces being spaced from said axis in such manner as to counterbalance the dissimilarities in the strength of said strip members at said axis such that said strip members exert a substantially zero transverse force on said actuator member.

References Cited by the Examiner
UNITED STATES PATENTS 3,021,861    2/1952    Billeter _______ 137—202 XR M. CARY NELSON, *Primary Examiner.*

ISADOR WEIL, WILLIAM F. O'DEA, *Examiners.*